United States Patent [19]

Neville

[11] 4,312,760

[45] Jan. 26, 1982

[54] METHOD FOR THE REMOVAL OF FREE AND COMPLEX CYANIDES FROM WATER

[76] Inventor: Roy G. Neville, 1068 Eden Bower La., Redwood City, Calif. 94061

[21] Appl. No.: 122,169

[22] Filed: Feb. 19, 1980

[51] Int. Cl.³ .................................................. C02F 1/58
[52] U.S. Cl. .................................. 210/724; 210/726; 210/904
[58] Field of Search ............... 210/DIG. 31, 904, 719, 210/721, 724, 726

[56] References Cited

U.S. PATENT DOCUMENTS

| | | | |
|---|---|---|---|
| 3,819,051 | 6/1974 | Henley et al. | 210/DIG. 31 |
| 4,003,833 | 1/1977 | Cavender | 210/DIG. 31 |

FOREIGN PATENT DOCUMENTS

| | | | |
|---|---|---|---|
| 2753401 | 9/1978 | Fed. Rep. of Germany | 210/DIG. 31 |
| 50-656 | 1/1975 | Japan | 210/DIG. 31 |
| 53-24740 | 7/1978 | Japan | 210/DIG. 31 |

*Primary Examiner*—Thomas G. Wyse
*Attorney, Agent, or Firm*—Townsend and Townsend

[57] ABSTRACT

Cyanide (free or as a metal complex) dissolved in an aqueous solution such as waste waters is substantially completely removed by the addition of ferrous bisulfite which forms insoluble Prussian blue and other non-toxic reaction products.

17 Claims, No Drawings

METHOD FOR THE REMOVAL OF FREE AND COMPLEX CYANIDES FROM WATER

BACKGROUND OF THE INVENTION

1. Field of the Invention

This invention relates to the chemical treatment of aqueous solutions such as waste water to remove dissolved cyanides.

2. Description of the Prior Art

It is known that concentrations of a few parts per million of soluble cyanides (e.g. sodium cyanide) are toxic to the microflora and microfauna which comprise the food-chain of higher forms of aquatic life such as fish, waterfoul, and eventually man. For this reason the United States Environmental Protection Agency (E.P.A.) has enacted strict laws to regulate the amount of soluble cyanides which may be discharged from any source into natural waters.

For certain industrial operations, such as the extraction of gold and silver from their ores, soluble cyanide compounds (e.g. sodium cyanide, potassium cyanide) are essential reagents used in the extraction process. In earlier years, mining and other industrial companies traditionally discharged their waste waters, containing sometimes as much as 50-100 parts per million (ppm) of soluble cyanide, into streams or rivers. It was assumed that the relatively small concentrations of soluble cyanides in the waste waters would be greatly diluted, dissipated and inactivated by the natural stream of river waters.

Numerous studies by ecologists, limnologists, and environmental scientists have demonstrated that concentrations of free, chemically uncomplexed, cyanide ion ($CN^-$) as low as 1 ppm are toxic to microflora and microfauna comprising the food-chain of fish and other animals.

For operations such as mining, electroplating, and similar industries which produce large volumes of waste waters containing soluble cyanides in concentrations in the range 1-50 ppm or more, the E.P.A. has enacted regulations which prohibit the discharge of waste waters that contain more than 0.02 ppm (i.e., 1 part in 50 million) to such cyanides.

Compliance with this extremely low concentration of cyanide in industrial waste waters which are discharged to the environment has presented enormous problems to the industries that must meet such standards.

Aeration of acidified solutions containing free cyanide ion results in only limited removal of cyanide as gaseous hydrogen cyanide. This method is not effective for the removal of complex cyanides with metals such as zinc, nickel, copper, cobalt, iron, etc. In acidified and aerated solutions, these complexes gradually decompose and free cyanide ion increases exponentially. What is urgently needed, therefore, is a process that will remove free or complex cyanide ions from solution as a stable precipitate and which will leave no detectable soluble cyanide species in solution. Such a process should also be rapid, economically feasible and industrially practicable. The present invention provides a process which attains these criteria.

The use of ferrous sulfate to precipitate soluble cyanide ion as the very insoluble compound, Prussian blue (ferric ferrocyanide) has been known for many years. This process has been shown to be effective in reducing the concentration of free or complex cyanide ion from relatively high initial concentrations (e.g. 100, 500, 1000 ppm) to very low concentrations of total cyanide in the supernatant solution. Unfortunately, the supernatant solution over the Prussian blue precipitate is found always to contain approximately 0.5-3.0 ppm cyanide ion, depending upon the conditions of treatment of the solution with ferrous ion. This concentration of cyanide is well above that which is allowed by current E.P.A. regulations in waste waters.

Treatment of the solution resulting from Prussian blue precipitation by passage through suitable ion exchange resins has met with only partial or limited success. Although some ion exchange resins can reduce the total cyanide concentration from the initial 0.5-3.0 ppm to less than 0.02 ppm, industrial practice has demonstrated that the efficiency of removal of total cyanide ion rapidly deteriorates as the active adsorption sites on the ion exchange resin become covered. The result is that while some ion exchange resins initially have the ability to reduce the total cyanide concentration in the supernatant solution from Prussian blue precipitation from approximately 0.5-3.0 ppm to less than 0.02 ppm, it is found that the efficiency of these resins falls off rapidly, and the legally permitted upper limit of 0.02 ppm cyanide is soon exceeded.

A further disadvantage of ion exchange resins is their need for regeneration, to desorb the adsorbed complex ions resulting from the treatment of the original solution with ferrous ion. While ferrocyanide and ferricyanide ions can usually be stripped from the resins fairly easily by the passage of suitable concentrated eluting solutions, other complex cyanides (e.g. cuprocyanide, cupricyanide, cobalticyanide) present major problems of removal, requiring extremely long and industrially impractical contact times with the eluting solutions. In many cases it has been found that not all of the adsorbed complex cyanide ions can be removed by eluting solutions. This, of course, progressively reduces the adsorption sites and consequently the efficiency of the regenerated resin.

There exists an urgent requirement, therefore, for a process in which the supernatant solution resulting from Prussian blue precipitation is treated chemically (not physicochemically, as in ion exchange) to reduce the cyanide concentration dependably to less than 0.02 ppm, or to "undetectable" levels.

One object of this invention is to provide a process by the use of which an aqueous solution containing free or complex cyanide ions is treated chemically to reduce the concentration of such ions to analytically undetectable levels.

Another object of this invention is to provide a process by the application of which an aqueous solution containing cyanide ions which are either uncomplexed with metals or complexed with metal ions as coordination compounds are treated to reduce the concentration of such uncomplexed or complexed cyanide ions to analytically undetectable levels in an industrially practicable and economic manner.

A further object of this invention is to provide a process by the use of which complexed or uncomplexed cyanide ions are treated to reduce the concentration of such cyanide ions to analytically undetectable levels and to produce a solution which is not toxic to aquatic or terrestrial organisms.

A further object is to provide a process the application of which is environmentally acceptable.

SUMMARY OF THE INVENTION

The above and other ecologically and environmentally useful objects are attained by this invention which provides a process for the removal of cyanide from an aqueous solution comprising: treating said solution with sufficient soluble ferrous ion in the presence of soluble bisulfite ion at an acidic pH compatible with said ferrous and bisulfite ions to react with the cyanide to produce Prussian blue and cyanide-free reaction products.

By a compatible acidic pH is meant a pH value which will maintain the ferrous and bisulfite ions in a form and state needed for the desired reaction. In the preferred embodiment it is desirable to maintain the pH of the aqueous solution at about 4–5.5. If the pH is more acidic, for example less than about 4, the bisulfite begins to decompose with the liberation of gaseous sulfur dioxide. If the pH is above about 5.5, the ferrous ion begins to precipitate as the hydroxide.

A convenient method for establishing the desired acidic pH in the aqueous solution is to add the bisulfite prior to the addition of the ferrous ion. By making the additions in that order the requisite acidity can be achieved which will prevent precipitation of the ferrous ion.

Any suitable materials may be added to the solution which will provide soluble bisulfite and ferrous ion in the solution without otherwise adversely affecting the stability of these ions in solution. For example, where the ferrous ion is added as a ferrous salt, its anion should be non-oxidizing.

Thus, the present process contemplates that bisulfite ions may be added directly to the solution or the bisulfite can be formed in situ by adding sulfite ions which are converted to bisulfite under the acidic conditions employed, or the bisulfite may be formed by dissolving gaseous sulfur dioxide in the solution. Similarly, the ferrous ion may be added as a soluble ferrous salt such as ferrous sulfate, ferrous chloride, ferrous ammonium sulfate, etc.

In the preferred embodiment, after the ferrous bisulfite has reacted with the cyanide in solution (both free cyanide ion and cyanide in solution as a complex ion with a metal) to form Prussian blue and other environmentally harmless reaction products, it is desirable to remove excess ferrous ion remaining in the solution. To this end the solution may be treated with base to make the solution alkaline and thereby precipitate residual ferrous ion. Any suitable base which will form an insoluble ferrous precipitate may be employed. For example, an alkali metal hydroxide such as sodium hydroxide may be added to adjust the pH to about 8–8.5. Alternatively, ferrous ion may be precipitated as a carbonate by adding, for example, sodium or potassium carbonate to raise the pH to about 8.5–9.0. It is preferred to adjust the pH to the alkaline ranges indicated to facilitate recycling of the precipitated ferrous ion, for industrially economic reasons. As the pH is raised substantially higher, such as in the range of pH 9–10, it is more difficult economically to recover and recycle the iron.

While the process is operable on solutions of any cyanide concentration by appropriate adjustment of reactant concentrations, in general the process will be utilized to operate on solutions containing a concentration of free cyanide ion of about 0.02–1000 ppm, and on solutions containing complex cyanide of the same concentration. Frequently the process will operate on solutions wherein the free cyanide and complex cyanide have a combined concentration of about 0.02–1000 ppm. A useful concentration of bisulfite ion and ferrous ion for treating such solutions is about 50–10,000 ppm of each of the bisulfite and ferrous ions.

In carrying out the process it is advantageous to avoid oxidation of the added ferrous ion prior to the desired reaction. If such oxidation occurs it will unnecessarily consume the bisulfite reducing agent to reverse the oxidation state of the iron.

DESCRIPTION OF THE PREFERRED EMBODIMENTS

The following examples are given in illustration of the invention.

EXAMPLE I

To prevent atmospheric oxidation, a 2 cm. layer of water-immiscible oil is placed on the surface of 500 milliliters (ml.) of water, of pH 8, containing 60 ppm free cyanide ion (as potassium cyanide). The aqueous solution is then treated with a concentrated solution of sodium bisulfite in an amount necessary to result in a bisulfite ion concentration in the mixture of 300 ppm. The solution is stirred briefly to insure complete mixing, then is allowed to stand unstirred for 5–10 minutes. Concentrated ferrous sulfate solution is then added in an amount necessary to result in a ferrous ion concentration in the mixture of 200–300 ppm. The pH value of the mixture falls from 8.0 to about 5.0, and the solution becomes blue due to the immediate formation of Prussian blue. After standing for 15 minutes at 20° C., unstirred, the blue solution is then treated with concentrated sodium hydroxide solution (e.g. 10 normal) to raise the pH value to 8.0–8.5 in order to precipitate ferrous hydroxide, which encapsulates the colloidally dispersed particles of Prussian blue. After standing unstirred for a further 10–15 minutes, to allow the ferrous hydroxide-Prussian blue precipitate to form and settle, the supernatant solution is then either filtered or decanted carefully from the precipitate. The clear, colorless solution is found to contain a concentration of cyanide (free and complex) which is undetectable when analyzed by the so-called standard reflux method, as recommended by the E.P.A., and as described in "Standard Methods for the Analysis of Waste Water", 14th edition, 1977.

EXAMPLE II

A 2 cm. layer of water-immiscible oil is placed on the surface of 500 ml. of water of pH 8.0 containing 10 ppm free cyanide ion (added as sodium cyanide), and 40 ppm ferrocyanide ion (added as potassium ferrocyanide). The aqueous solution is then treated with 200 ppm sulfite ion (added as sodium sulfite), stirred briefly to insure thorough mixing, and then allowed to stand unstirred for 5–10 minutes. Ferrous sulfite, or ferrous ammonium sulfate, solution is then added, with stirring, to give a ferrous ion concentration of 200–300 ppm. The pH value of the mixture falls to approximately 4–5, and the solution becomes blue due to the formation of Prussian blue. After standing, unstirred, for approximately 10–15 minutes at 20° C., the blue solution is treated with a saturated (or nearly saturated) solution of sodium or potassium carbonate, to raise the pH value to 8.5–9.0, and to precipitate ferrous carbonate which encapsulates the colloidally dispersed particles of Prussian blue. The mixture is allowed to stand, unstirred, for approximately 10–15 minutes, to allow the ferrous carbonate- Prussian blue precipitate to form and settle. The clear, colorless supernatant solution is then either filtered or carefully decanted from the precipitate. The supernatant solution is found to contain a concentration of cyanide ion (free or complex) which is undetectable when analyzed by the so-called reflux method, as recommended by the E.P.A., and as described in "Standard Methods for the Analysis of Waste Water", 14th edition, 1977.

A detailed survey of the chemical literature reveals very little information on the reaction of sulfite or bisulfite ions, or of ferrous sulfite, with cyanide ion at very low concentrations (e.g. 1–50 ppm). While the present reactions are as yet not fully understood, it is believed that in addition to being precipitated as the very insoluble compound, Prussian blue (ferric ferrocyanide), the cyanide ion is concurrently hydrolyzed by the bisulfite ion, at pH 4–6, to ammonium formate:

$$HCN + 2H_2O = HCOONH_4$$

Thereafter the ammonium formate dissociates to water, carbon dioxide and ammonia.

It is essential to understand that the use of soluble ferrous ion alone, or of bisulfite ion alone, does not completely remove free cyanide ion from the solution. The essence of the present invention is that it is only by the use of ferrous bisulfite that free cyanide ion is substantially destroyed and removed from solution. This invention will thus provide a very useful solution to the long-standing problem confronting industry of reducing cyanide ion concentrations in waste waters to undetectable levels, and allowing these waste waters to be safely discharged to the environment. The relatively minute concentrations of sulfite ion remaining in the waste waters pose no environmental problems as sulfite and bisulfite ions are rapidly oxidized to sulfate and bisulfate ions by atmospheric oxygen which is always present in the waters. In fact, the oxidation of residual sulfite and bisulfite ions, if present, is accelerated by the presence of residual ferrous ion, as this ion is well-known to be an "oxygen carrier" (e.g. in the hemoglobin of blood). Thus, traces of sulfite or bisulfite ion remaining in the waste waters will rapidly disappear. The sulfate and bisulfate ions resulting from the oxidation of sulfite and bisulfite ions are well-known not to be environmentally harmful when in such minute concentrations as they are in the present invention.

I claim:

1. A process for the removal of cyanide from an aqueous solution comprising: treating said solution with sufficient soluble ferrous ion in the presence of soluble bisulfite ion at an acidic pH below about 6 compatible with maintaining said ferrous and bisulfite ions in said solution to react with the cyanide to produce Prussian blue and cyanide-free reaction products.

2. A process in accordance with claim 1 wherein said bisulfite ion is formed at said acidic pH from sulfite ion that is added to said solution.

3. A process in accordance with claim 1 wherein said bisulfite ion is formed at said acidic pH from gaseous sulfur dioxide that is added to said solution.

4. A process in accordance with claim 1 wherein said acidic pH is about 4–5.5.

5. A process in accordance with claim 1 wherein the concentration of bisulfite ion is about 50–10,000 ppm.

6. A process in accordance with claim 1 wherein the concentration of ferrous ion is about 50–10,000 ppm.

7. A process in accordance with claim 1 wherein the cyanide in said aqueous solution is present as free cyanide ion and as a complex ion with a metal.

8. A process in accordance with claim 7 wherein the concentration of free cyanide ion is about 0.02–1,000 ppm.

9. A process in accordance with claim 7 wherein the concentration of cyanide in the form of a complex ion is about 0.02–1,000 ppm.

10. A process in accordance with claim 7 wherein the free cyanide ion and complex cyanide ion have a combined concentration of about 0.02–1,000 ppm.

11. A process in accordance with claim 1 wherein the pH value of the aqueous solution is maintained at said acidic pH with said bisulfite ion, said bisulfite ion being present in the solution prior to said ferrous ion.

12. A process in accordance with claim 1 wherein the pH of the solution is made alkaline after production of said Prussian blue to precipitate residual ferrous ion.

13. A process in accordance with claim 12 wherein said solution is adjusted to a pH of about 8–8.5 after production of the Prussian blue.

14. In the treatment of cyanide-containing waste waters to render them environmentally non-toxic to microflora and microfauna by the removal of cyanide from the waste waters, the improvement comprising concurrently reacting at slightly acidic pH below about 6 compatible with the simultaneous presence of soluble ferrous and bisulfite ions free and metal-complex cyanide in the waste waters with added ferrous ions to precipitate Prussian blue and residual cyanide ions with bisulfite to form environmentally harmless reaction products.

15. An improved process in accordance with claim 14 wherein said Prussian blue and environmentally harmless reaction products are formed in a slightly acid solution and thereafter the solution is made alkaline to form a ferrous ion-containing precipitate which encapsulates colloidally dispersed particles of Prussian blue during formation and settling.

16. An improved process in accordance with claim 15 wherein said ferrous ion-containing precipitate is formed with a soluble hydroxide at a pH of about 8.0–8.5.

17. An improved process in accordance with claim 15 wherein said ferrous ion-containing precipitate is formed with a soluble carbonate at a pH of about 8.5–9.0.

* * * * *